(12) United States Patent
Bottomley

(10) Patent No.: US 6,842,479 B2
(45) Date of Patent: Jan. 11, 2005

(54) METHOD AND APPARATUS FOR INTERFERENCE CANCELLATION IN A RAKE RECEIVER

(75) Inventor: Gregory E. Bottomley, Cary, NC (US)

(73) Assignee: Ericsson Inc., Research Triangle Park, NC (US)

(*) Notice: Subject to any disclaimer, the term of this patent is extended or adjusted under 35 U.S.C. 154(b) by 279 days.

(21) Appl. No.: 09/992,094

(22) Filed: Nov. 5, 2001

(65) Prior Publication Data

US 2002/0051485 A1 May 2, 2002

Related U.S. Application Data

(62) Division of application No. 09/165,647, filed on Oct. 2, 1998.

(51) Int. Cl.[7] .............................................. H04L 27/30
(52) U.S. Cl. ........................................ 375/150; 375/343
(58) Field of Search .................................. 375/130, 147, 375/150, 343, 148

(56) References Cited

U.S. PATENT DOCUMENTS

| 5,237,586 | A | * | 8/1993 | Bottomley | 375/130 |
|---|---|---|---|---|---|
| 5,572,552 | A | | 11/1996 | Dent et al. | 375/343 |
| 5,677,930 | A | | 10/1997 | Bottomley | 375/208 |
| 5,680,419 | A | | 10/1997 | Bottomley | 375/347 |
| 5,768,306 | A | | 6/1998 | Sawahashi et al. | |
| 6,363,105 | B1 | * | 3/2002 | Sourour et al. | 375/150 |

* cited by examiner

Primary Examiner—Temesghen Ghebretinsae
(74) Attorney, Agent, or Firm—Coats & Bennett, P.L.L.C.

(57) ABSTRACT

Systems and methods for despreading received spread spectrum signals are described. Despreading can be performed using both channel estimates and impairment correlation estimates. Techniques for selecting delays of interest are also described, along with a despreading mechanism which saves power by operating only on delays of interest.

4 Claims, 4 Drawing Sheets

METHOD AND APPARATUS FOR INTERFERENCE CANCELLATION IN A RAKE RECEIVER

This is a division of application Ser. No. 09/165,647, filed Oct. 2, 1998.

BACKGROUND

Wireless communications is expanding at a phenomenal rate, as more radio spectrum becomes available for commercial use and as cellular phones become commonplace. For example, in the United States, wireless phone service is offered both in the cellular (800 MHz) and PCS (1900 MHz) bands.

In addition, there is currently an evolution from analog communications to digital communications. Speech is represented by a series of bits, which are modulated and transmitted from a base station to a phone. The phone demodulates the received waveform to recover the bits, which are then converted back into speech. There is also a growing demand for data services, such as e-mail and Internet access, which require digital communications.

There are many types of digital communications systems. Traditionally, frequency-division-multiple-access (FDMA) is used to divide the spectrum up into a plurality of radio channels corresponding to different carrier frequencies. These carriers may be further divided into time slots, referred to as time-division-multiple-access (TDMA), as is done in the D-AMPS, PDC, and GSM digital cellular systems. Alternatively, if the radio channel is wide enough, multiple users can use the same channel using spread spectrum techniques and code-division-multiple-access (CDMA).

Direct-sequence (DS) spread-spectrum modulation is commonly used in CDMA systems, in which each information symbol is represented by a number of "chips." Representing one symbol by many chips gives rise to "spreading," as the latter typically requires more bandwidth to transmit. The sequence of chips is referred to as the spreading code or signature sequence. At the receiver, the received signal is despread using a despreading code, which is typically the conjugate of the spreading code. IS-95 and J-STD-008 are examples of DS CDMA standards.

With DS CDMA systems, coherent Rake reception is commonly used. The received signal is despread by correlating to the chip sequence, and the despread value is weighted by the conjugate of a channel coefficient estimate, removing the phase rotation of the channel and weighting the amplitude to indicate a soft or confidence value. When multipath propagation is present, the amplitude can vary dramatically. Multipath propagation can also lead to time dispersion, which causes multiple, resolvable echoes of the signal to be received. Correlators are aligned with the different echoes. Once the despread values have been weighted, they are summed. This weighting and summing operation is commonly referred to as Rake combining.

A typical digital communications system 100 is shown in FIG. 1. Digital symbols are provided to transmitter 101, which maps the symbols into a representation appropriate for the transmission medium or channel (e.g. radio channel) and couples the signal to the transmission medium via antenna 102. The transmitter signal passes through channel 103 and is received at antenna 104. The received signal is passed to receiver 105. The receiver 105 includes a radio processor 106, a baseband signal processor 110, and a post processing unit 112.

The radio processor tunes to the desired band and desired carrier frequency, then amplifies, mixes, and filters the signal down to baseband. At some point, the signal is sampled and quantized, ultimately providing a sequence of baseband received samples. Since the original radio signal has in-phase (I) and quadrature (Q) components, the baseband samples typically and I and Q components, giving rise to complex, baseband samples.

The baseband processor 110 is used to detect the digital symbols that were transmitted. It may produce soft information as well, which gives information regarding the likelihood of the detected symbol values.

The post processing unit 112 performs functions that depend highly on the particular communications application. For example, it may use the soft detected values to perform forward error correction decoding or error detection decoding. It may convert digital symbols into speech using a speech decoder.

Coherent detection requires estimation of how the symbols were modified by the transmitter, channel, and/or radio processor. As discussed previously, the transmission medium introduces phase and amplitude changes in signal, as a result of multipath propagation. The signal may also have become dispersed, giving rise to signal echoes, each echo having a phase and amplitude associated with it, represented by a complex channel coefficient. Each echo also has a delay associated with it. Coherent demodulation requires estimation of these delays and coefficients. Typically, the channel is modeled as discrete rays, with channel coefficients assigned to the different delays.

A conventional baseband processor, 200, is illustrated in FIG. 2. This is the standard baseband processor in a typical, coherent Rake receiver. The baseband signal is provided to a bank of correlators 202, which correlate different delays of the received signal to the despreading code, producing correlations, also referred to as despread values. The delays are provided by channel delay estimator 204, which uses known methods to estimate the delays, such as finding delays which give large despread values. The despread values corresponding to different delays are combined in combiner 206 using a weighted sum. The weights are the conjugates of channel coefficient estimates provided by channel coefficient estimator 208. For example, correlations to a pilot signal can be used to obtain channel coefficients.

Consider a simple example, in which the received chip-spaced baseband samples during one symbol period are represented by r(k). These samples are modeled as:

$$r(k)=bc_0 s(k)+bc_1 s(k-1)+w(k) \tag{1}$$

where b is the symbol sent, $c_0$ and $c_1$ are the channel coefficients, the delays are 0 and 1 chip period, s(k) is the chip sequence used to spread the symbol, and w(k) is a sequence of impairment (noise+interference) samples.

The bank of correlators produces two despread values, denoted $x_0$ and $x_1$, corresponding to the two rays. These can be expressed as:

$$x_0 = \frac{1}{L}\sum_{k=0}^{L-1} s^*(k) r(k) \tag{2}$$

where superscript "*" denotes complex conjugation and L is the despreading factor. Division of L is shown for illustrative purposes, while in practice it is well known how to extend results to the case when the division is omitted.

$$x_1 = \frac{1}{L}\sum_{k=0}^{L-1} s^*(k)r(k+1) \quad (3)$$

The combiner combines the two despread values using estimates of the channel coefficients, denoted $\hat{c}_0$ and $\hat{c}_1$, to produce a detection statistic that corresponds to an information symbol. This can be expressed as $$z = \hat{c}_0^* x_0 + \hat{c}_1^* x_1 \quad (4)$$

The symbol value that is closest to z gives the detected value $\hat{b}$. For BPSK modulation, b is either +1 or −1, so that the detected value is given by the sign of z.

Channel coefficients can be estimated separately using standard approaches. For example, with least mean square (LMS) estimation of $c_0$, one would form the time varying estimate $\hat{c}_0(n)$, where n is an index denoting symbol period, using $$\hat{c}_0(n+1) = \hat{c}_0(n) + \mu \hat{b}^*(n)(x_0(n) - \hat{c}_0(n)\hat{b}(n)) \quad (5)$$

where $\mu$ is the LMS step size. Also $\hat{b}$ is the detected symbol value.

It can be shown that the conventional, coherent Rake receiver is optimal when the impairment samples are uncorrelated. However, for cellular communication systems, the impairment includes interference from one's own base station as well as interference from other base stations. This interference is typically noise-like at the transmitter. However, at the receiver, the interference has passed through dispersive channels, which introduce correlation. Thus, for cellular systems, the impairment samples are correlated and the conventional Rake receiver is no longer optimal, see, for example, Bottomley, "Optimizing the Rake receiver for the CDMA downlink," Proc. 43$^{rd}$ IEEE Veh. Technol. Conf. (VTC '93), Secaucus, N.J., May 18–20, 1993.

Approaches which solve this problem are given in U.S. Pat. No. 5,572,552 to Dent et al. Consider combining weight formation. First IIR filtering approaches are given, in which detection statistics are formed using a weighted combination of despread values and a weighted combination of other detection statistics. Second, a FIR approach is given. Both IIR and FIR approaches rely on estimating the channel responses from each base station to the receiver as well as noise and interference power levels. This requires multiple estimation processes that increase complexity. Finally, a purely adaptive scheme is given, in which the combining weights are tracked directly using decision feedback. However, such approaches take time to converge and don't necessarily track variations well. Thus, there is a need for improved combining weight computation.

Next, consider delay estimation or correlator placement. In the aforementioned patent, an SNR criterion is used for tap placement that depends on channel response, noise power, and interference power estimates. Again, many quantities must be estimated, increasing complexity. Thus, there is a need for a lower complexity approach to correlator placement.

SUMMARY OF THE INVENTION

The aforementioned problems are solved by the present invention by employing an adaptive whitening operation between the Rake fingers, so that interference that has been colored by a dispersive channel can be cancelled. The approach estimates fewer quantities than past approaches, lumping noise and interference into one impairment process, whose correlation across tap locations is estimated.

BRIEF DESCRIPTION OF THE DRAWINGS

The features and advantages of the invention will be understood by reading the description in conjunction with the drawings, in which.

DETAILED DESCRIPTION

For wireless communications, the transmitter emits electromagnetic waveforms from an antenna, the medium is the radio propagation environment, and the receiver employs one or more antennas to recover the transmitted signal. While the present invention is described in the context of radio communications, it is not limited to such systems. It is also applicable to wireline communications and magnetic storage systems. In such applications the radio processor is generalized to a device that extracts data from the transmission or storage medium.

In the present invention, the receiver exploits the fact that, in general, the impairment (noise plus interference) on the different correlators is correlated. This correlation is estimated and used in the combining process. As a result, redundant interference components are removed. Implicitly, a whitening operation occurs, which cancels redundant interference components.

Figure 1:
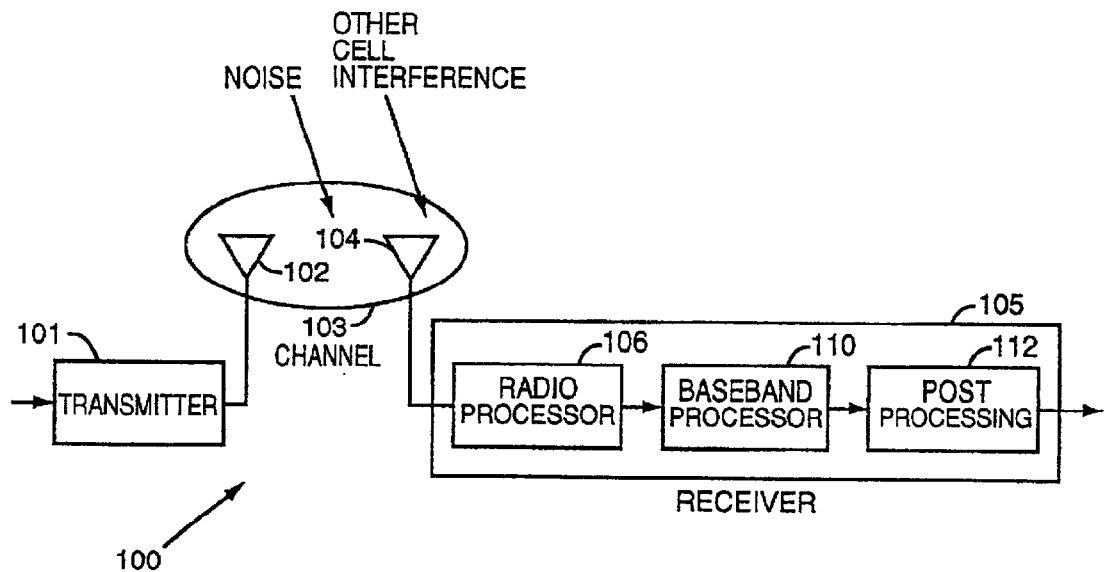
FIG. 1 is a general digital communications system.
Figure 2:
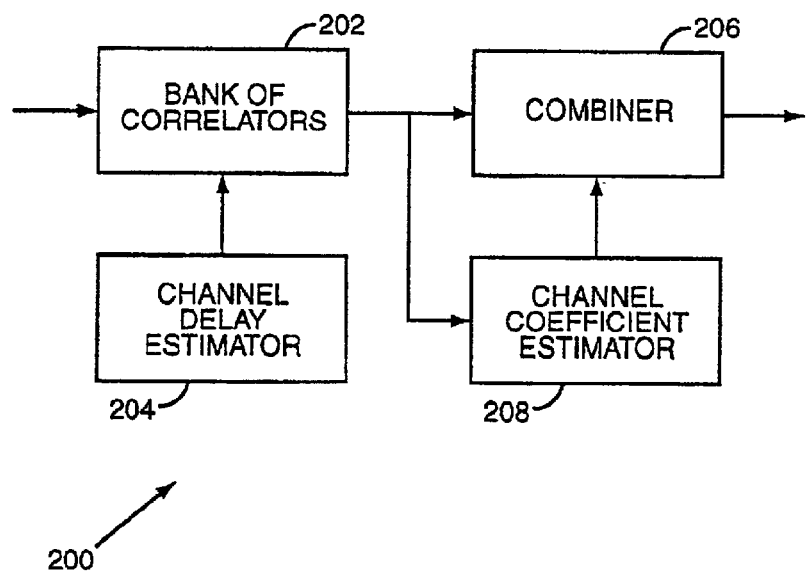
FIG. 2 is a baseband processor according to the prior art.
Figure 3:
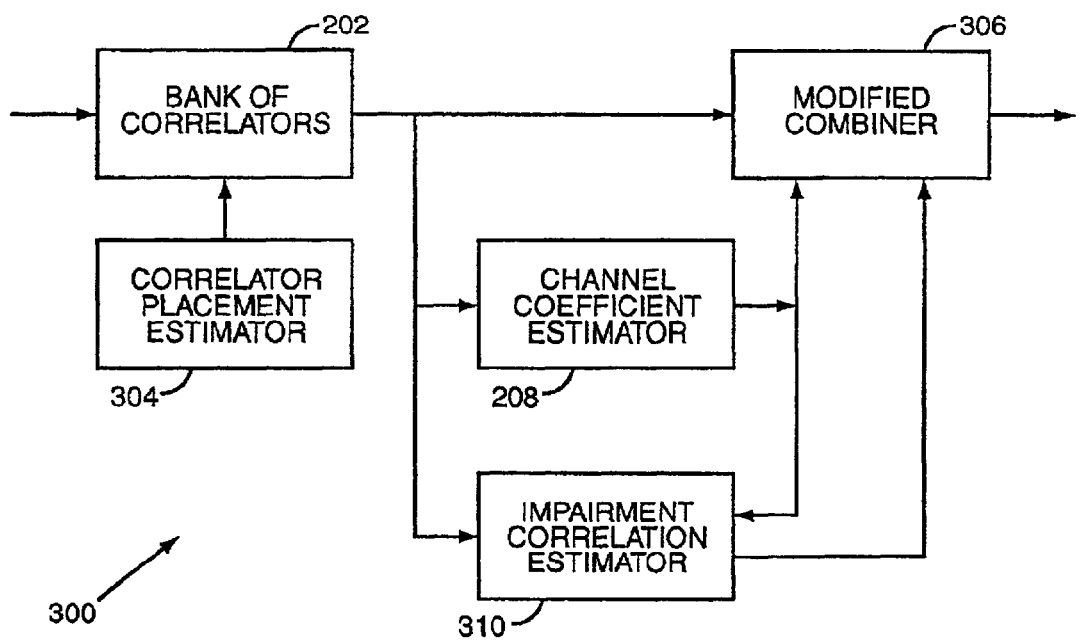
FIG. 3 is a baseband processor according to the present invention.

A baseband processor according to the present invention, 300, is illustrated in FIG. 3. Throughout, like reference numerals are used to refer to like elements. The baseband signal is provided to a bank of correlators 202, which correlates different delays of the received signal to the spreading code. The delays are provided by correlator placement estimator 304. The despread values corresponding to different delays are combined in modified combiner 306. The modified combiner 306 uses channel coefficient estimates from channel coefficient estimator 208 and impairment correlation estimates from impairment correlation estimator 310 to combine the despread values to form a detected symbol output.

The impairment correlation estimator 310 estimates correlation between the impairment on the different correlator outputs. In the past, impairment correlation among different antenna signals has been used with MLSE reception to cancel interference, as disclosed in U.S. Pat. No. 5,680,419 to Bottomley, which is incorporated herein by reference. With the present invention, correlation among different despread values from the same antenna signal is exploited in a Rake receiver.

The approach for estimating the impairment correlation can be similar to the approaches given in the Bottomley patent, except that despread values from the same antenna are used instead of received samples from different antennas. For example, error signals for the different correlators can be used. For the two-ray example, these error signals would be:

$$e_0 = x_0 - \hat{b}\hat{c}_0 \quad (6)$$

$$e_1 = x_1 - \hat{b}\hat{c}_1 \quad (7)$$

where $\hat{b}$ is a detected symbol value. If there are pilot symbols, known values can be used. If there is a pilot channel, there is an effective symbol value, usually +1.

Collecting the error signals into a vector e(n), where n denotes symbol period, then an impairment correlation matrix estimate $\hat{R}(n)$ can be updated using:

$$\hat{R}(n) = \lambda \hat{R}(n-1) + e(n) e^H(n) \quad (8)$$

where superscript "H" denotes Hermitian transpose. Note that $\hat{R}(n)$ is Hermitian, i.e. $\hat{R}^H = \hat{R}$, so that only the diagonal and one of the off diagonal triangles (upper or lower) need be estimated and updated. For the two-ray example, the R matrix has the form:

$$\hat{R} = \begin{bmatrix} \rho_{00} & \rho_{01} \\ \rho_{01}^* & \rho_{11} \end{bmatrix} \quad (9)$$

where $\rho_{00}$ and $\rho_{11}$ are real numbers (imaginary part is zero). Note that the inverse of this matrix is used in combining. The inverse can be updated directly using the well known matrix inversion lemma. The term "impairment correlation" is used to refer not only to correlations, but to any related quantities, such as an inverse correlation matrix.

The modified combiner 306 would then combine the despread values using both the channel co-efficients and the impairment correlations to produce a detection statistic. The combining operation can be expressed as:

$$z' = \hat{c}^H \hat{R}^{-1} x \quad (10)$$

where the channel coefficients have also been collected into a vector. The detection statistic can be further processed to produce a detected symbol value. It can also be used as a soft value for further processing.

The combining can be implemented in a number of ways. The despread values can be combined by the impairment correlation matrix first, then combined by the channel coefficients. Alternatively, the channel coefficients and the impairment correlation can be pre-combined to form weights:

$$w = \hat{R}^{-1} \hat{c} \quad (11)$$

Then the detection statistic can be expressed as:

$$z' = w^H x \quad (12)$$

Alternatively, combining with the impairment correlation matrix estimate and the channel coefficient estimates can be done together. For the two-ray example, this can be expressed as:

$$z' = \frac{1}{|\hat{R}|} [(\rho_{11} \hat{c}_0^* - \rho_{01}^* \hat{c}_1^*) x_0 + (\rho_{00} \hat{c}_1^* - \rho_{01} \hat{c}_0^*) x_1] \quad (13)$$

where $$|\hat{R}| = \rho_{00} \rho_{11} - |\rho_{01}|^2 \quad (14)$$

Also, it is possible to factorize the inverse impairment correlation matrix estimate using square-root factorization, giving two factors:

$$\hat{R}^{-1} = Q^H Q \quad (15)$$

Thus, the combining operation can be expressed as:

$$z' = g^H y \quad (16)$$

where $$y = Qx \quad (17)$$

and $$g = Q\hat{c} \quad (18)$$

Multiplying the despread vector by Q whitens the impairment, but changes the overall channel response. As a result, the channel coefficients have to be modified as well.

Based on square-root Kalman filtering, it is possible to estimate and track the square-root matrix Q, which is another form of impairment correlation. Then, the despread values used for detection and the despread values used for channel coefficient estimation can be whitened first. Standard channel coefficient estimation applied to the whitened despread values will yield g. Alternatively, one can track the channel, then apply the square root to the channel coefficient estimates, as shown above.

The operation of the correlator placement unit 304 can employ any conventional delay estimation approach. For example, unit 304 can employ the approaches disclosed in pending U.S. patent application Ser. No. 09/005,580, entitled "Multiple Delay Estimation for Direct Sequence Spread Spectrum Systems" filed on Jan. 12, 1998, which is incorporated herein by reference, in its entirety. However, the correlator placement unit 304 can alternatively employ a different approach, based on modifying the approaches in the aforementioned pending application, e.g., modifying the metric to include an estimate of the impairment correlation matrix.

Figure 4:
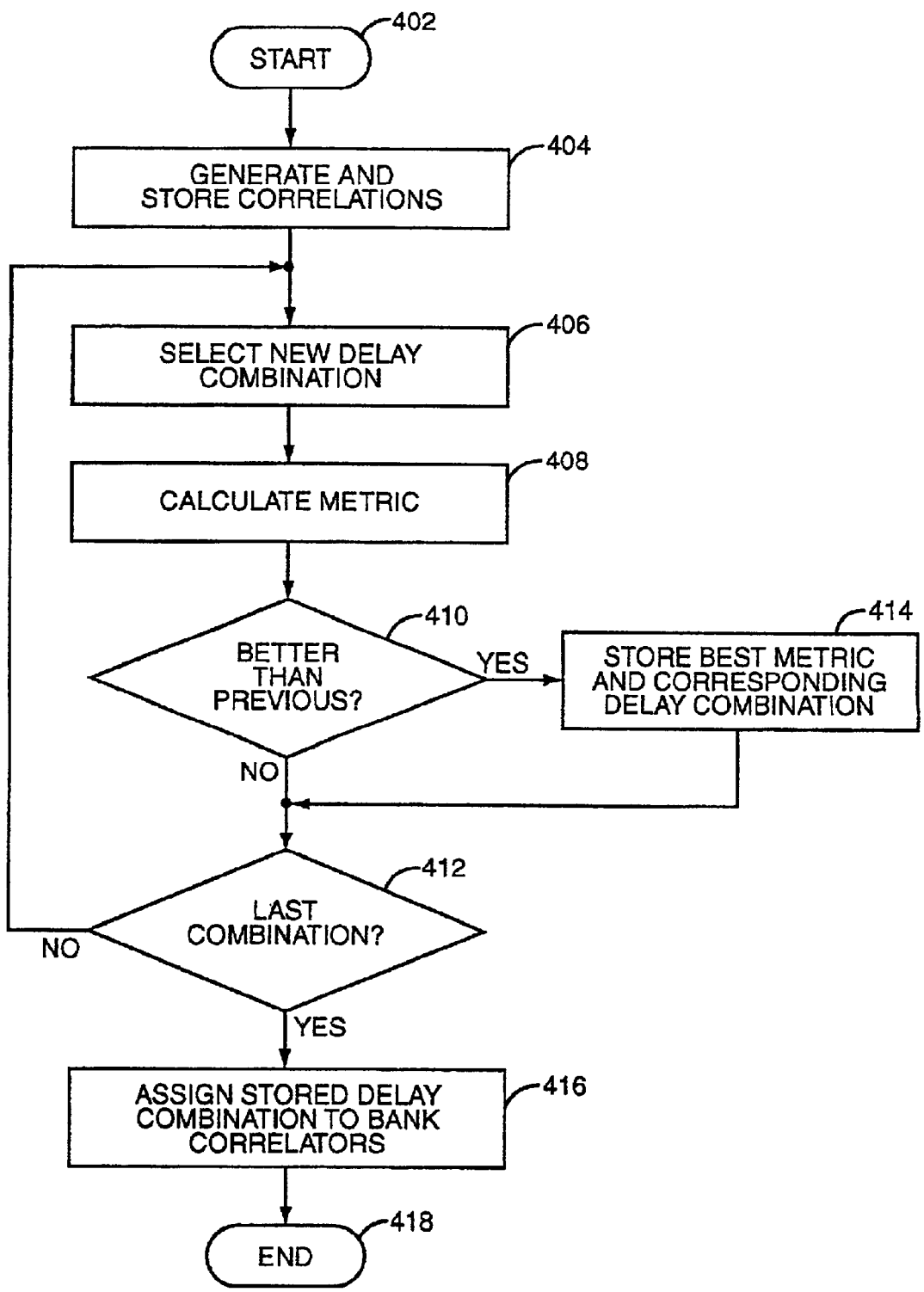
FIG. 4 is a process for correlator placement estimation according to the present invention.

For example, one of the approaches is illustrated in FIG. 4. The process starts in start block 402. Then despread values corresponding to different delays are generated and stored in step 404. Then, at step 406, hypothesized tap locations or delays are made. In step 408, a metric is then calculated corresponding to this set of delays. In step 410, the metric is compared to previous ones. If the metric is better, it is stored as the new best metric and the corresponding delay combination is also stored. Then, in step 412, it is determined whether all the delay combinations have been exhausted. If not, the next combination is considered in step 406. Otherwise, the delay estimates are taken to be the ones corresponding to the best metric and the process ends in step 418.

Figure 5:
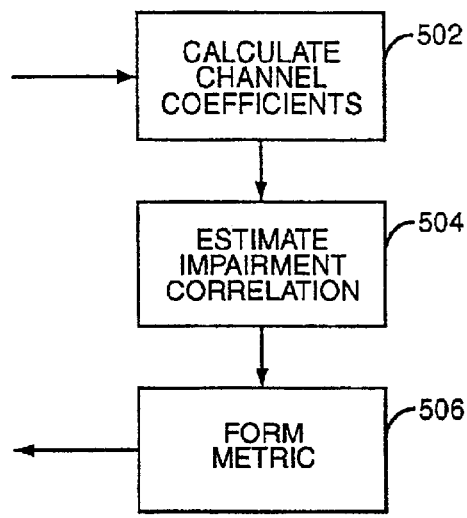
FIG. 5 is a metric computation process for use in correlator placement estimation according to the present invention.

The key distinction is how the metric is calculated. The metric calculation step 408 is further detailed in FIG. 5. For the delay combination, a set of channel coefficients are estimated using standard approaches in step 502. These channel coefficients should be the "composite" channel coefficients, corresponding to the transmit, medium, and receive filter responses. Side information in the form of transmit and/or receive filter response knowledge can be used to improve estimation, as discussed in the aforementioned pending U.S. Patent Application to Sourour et al. Then, in step 504, the impairment correlation is estimated using the approaches described previously. Finally, in step 506, the metric is computed using both the channel coefficient estimates and the impairment correlation estimates. The preferred metric can be expressed as:

$$J = \hat{c}^H \hat{R}^{-1} \hat{c} \quad (19)$$

which corresponds to an SNR figure of merit.

Similarly, impairment correlation among different antenna signals has been used with synchronization, as disclosed in pending application U.S. patent application Ser. No. 08/773,560 to Bottomley and Chennakeshu, filed Dec. 27, 1996, which is incorporated here in its entirety by reference. With the present invention, correlation among different despread values form the same antenna signal is exploited to determine correlator or "finger" placement in a Rake receiver.

It may be advantageous to perform conventional delay estimation first, then consider delays within a certain proximity of the conventional delay estimates. It may also be desirable to keep the M strongest ray delay estimates, then only consider alternatives for the remaining P delay estimates.

Figure 6:
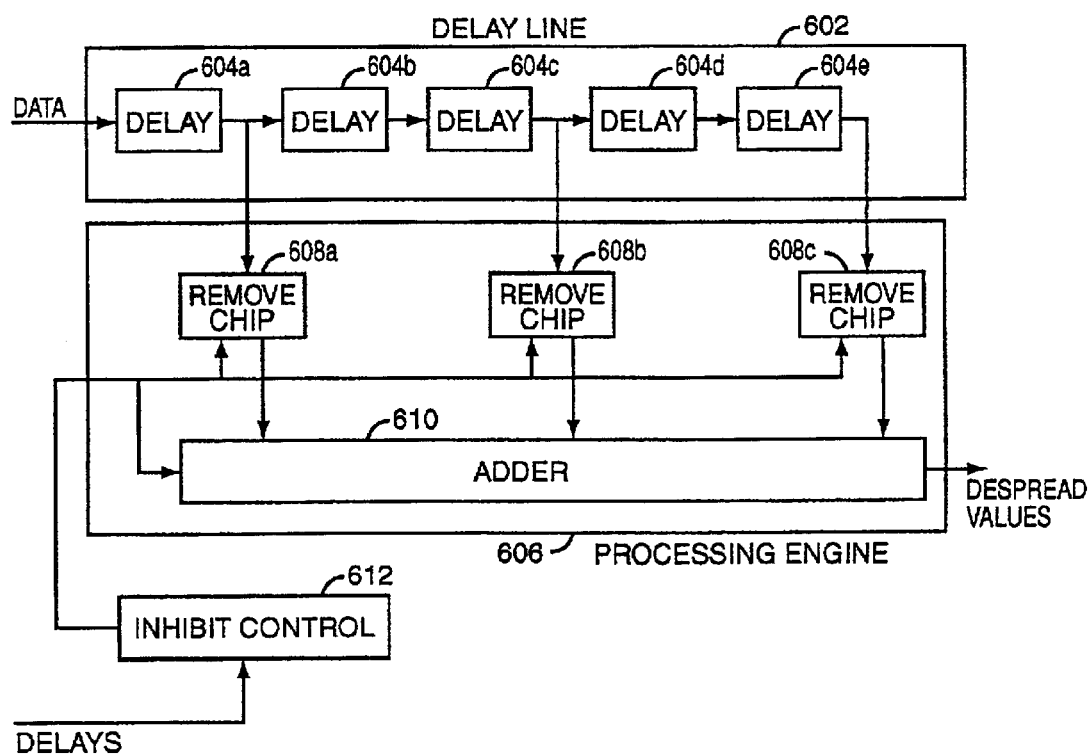
FIG. 6 is an inhibit-controlled sliding correlator according to the present invention.

Referring back to FIG. 3, the bank of correlators 202 can be realized in a number of ways. It can be a group of integrate-and-dump correlators. It can also be realized using a single sliding correlator. In this case, delays associated with the bank of correlators correspond to selecting which of the outputs of the sliding correlator are kept for further processing. A third approach is to use a selectively inhibited sliding correlator as illustrated in FIG. 6.

Data samples are provided to delay line 602, which includes delay elements 604a–604c. For this example, it is assumed that the sampling rate is two samples per chip and that the despreading code section has length three. It will be apparent to one skilled in the art that this aspect of the present invention may be extended to any sampling rate and any despreading length. Also note that delay 604a may be omitted, depending on how the input samples are generated.

The delayed samples are provided to processing engine 606, which includes remove chip units 608a–608c and adder 610. The delayed samples are provided to remove chip units 608a–608c, where the despreading chip values are removed from the samples, producing modified samples. For example, the received sample is multiplied by the conjugate of the despreading chip value. When chip values are +1 or −1, then chip removal is simply negating or not negating the received sample. The modified samples are added together in adder 610, to produce despread values.

What distinguishes the operation of the processing engine 606 from a conventional sliding correlator is that the operation of the elements in the processing engine 606 can be selectively inhibited, saving power when despread values are not needed. Thus, remove chip units 608a–608c and adder 610 have a control input, which determines whether an operation will be performed or not.

The processing engine 606 is controlled by inhibit unit 612, which produces the control signal based on the delays to be used. In essence, the inhibit control unit 612 instructs the processing engine 606 to produce despread values only for those delays of interest. For all other delays, the inhibit control unit 612 instructs the processing engine 606 not to process the delayed samples.

The delay line 602 can be efficiently implemented as a circular buffer. This avoids the power consuming need to repeatedly shift data samples.

This approach overcomes the problem that a bank of 4 integrate-and-dump correlators can only examine up to 4 delays. It also overcomes the problem that a sliding correlator has, which is large power consumption. The inhibit-controlled sliding correlator can be used with conventional Rake combining as well as for initial acquisition and delay tracking.

Referring back to FIG. 3, other forms of correlation combining can be used, based on known antenna array processing approaches. For example, the impairment correlation estimate can be replaced by a despread correlation estimate, in which the error signal e is replaced with x when forming the $\hat{R}$ matrix. This approach will also cancel interference, though the "soft" detection statistic will not work as well in subsequent processing as the preferred embodiment already given.

The present invention can use any type of channel coefficient tracking algorithm. For example, the LMS, KLMS (see, e.g., Jamal et al., "Adaptive MLSE performance on the D-AMPS 1900 channel," IEEE Trans. Veh. Technol., vol. 46, pp. 634–641, August 1997), RLS, and Kalman tracking algorithms are appropriate. While chip-spaced rays were used as examples, the rays can have arbitrary spacing, including fractional spacing. Channel coefficient estimation can also be done using interpolation between pilot symbol sections. Similarly, the present invention can use a number of approaches to impairment correlation estimation. The impairment correlation can be either tracked or interpolated between pilot symbol sections. When receiver quantities are tracked, per survivor processing (PSP) can be used to improve performance, by keeping channel coefficient estimates and impairment correlation estimates per hypothesized symbol values.

A modified approach is possible, in which the impairment correlation estimate used to combine the despread values is a combination of the impairment correlation estimate and a fixed value. This provides a way of gracefully switching between conventional approaches (the fixed value is the identity matrix) and the present invention. It can also be used to switch between an adaptive estimate and a known structure. For example, if the interference is nondispersive, then the impairment is colored only by the receive filter. Thus, the fixed matrix could be a matrix of pulse shape autocorrelation values, possibly scaled by an estimate of the noise power. The "fixed matrix" could also be adaptive, using a pulse shape autocorrelation matrix scaled by an adaptive noise power estimate.

The present invention can be used in a multi-pass approach. Despread values corresponding to a data frame can be stored. In the post-processing phase, forward-error-correction and forward-error-detection decoding can be used to correct or detect errors. Then, re-encoding can be used to provide reference symbols for a second-pass, for better parameter estimation. Multi-pass demodulation is described in U.S. Pat. No. 5,673,291 to Dent which is incorporated herein by reference.

The present invention can also be used in conjunction with multiple receive antennas. In pending U.S. patent application Ser. No. 08/992,174 to Jonas Karlsson and Sara Mazur, entitled "Code division multiple access mobile station interference suppression", multiple antenna despread values corresponding to a particular delay are combined using an impairment estimate across antennas. With the present invention, the despread values from all antennas would be collected together into one set of despread values, which would be combined according to the present invention. Thus, impairment correlation across antennas and across delays would be estimated and used in combining.

A hybrid approach is possible, in which groups of despread values are combined using the present invention, and those groups are then simply added together to form the detection statistic. Unlike the aforementioned application to Karlsson et al., the groups do not necessarily have to correspond to the same delay, but different antennas.

The invention has been described in the context of a single, modulated traffic channel. However, the invention is also applicable to systems with pilot symbols or with a pilot channel, such as the IS-95 downlink. With pilot symbols, the symbol values are known, so that channel coefficient estimation and impairment estimation can use known, instead of detected, symbol values. With a pilot channel, the pilot channel can be viewed as a continuous sequence of known symbol values (usually all +1). Thus, these known symbol values could be used.

Those skilled in the art will appreciate that the present invention is not limited to the specific embodiments which have been described herein for the purposes of illustration. The scope of the invention, therefore, is defined by the claims which are appended hereto, rather than the foregoing description, and all equivalents which are consistent with the meaning of the claims are intended to be embraced herein.

What is claimed is:

1. A sliding correlator comprising:

a delay line having a plurality of delay elements for delaying a stream of data samples input thereto;

a plurality of remove chip units, each associated with an output of one of said plurality of delay elements, for removing chips from said delayed data samples;

an adder for receiving outputs from said plurality of remove chip units and adding said outputs together; and an inhibit unit for selectively enabling at least one of said plurality of remove chip units and said adder.

2. The sliding correlator of claim 1, wherein said delay line is a circular buffer.

3. The sliding correlator of claim 1, wherein said inhibit unit operates to enable said at least one of said plurality of remove chip units and said adder only for delays of interest.

4. The sliding correlator of claim 1, wherein said inhibit unit selectively enables and disables said plurality of remove chip units and said adder together.

* * * * *